United States Patent [19]

Brown et al.

[11] 4,262,093
[45] * Apr. 14, 1981

[54] RIGID POLYURETHANE FOAM-FORMING COMPOSITIONS

[75] Inventors: Jasper H. Brown, East Alton; Albert W. Morgan, Collinsville, both of Ill.; Donald S. T. Wang, St. Louis, Mo.

[73] Assignee: Monsanto Company, St. Louis, Mo.

[*] Notice: The portion of the term of this patent subsequent to Oct. 2, 1996, has been disclaimed.

[21] Appl. No.: 44,609

[22] Filed: Jun. 1, 1979

Related U.S. Application Data

[63] Continuation-in-part of Ser. No. 864,890, Dec. 27, 1977, Pat. No. 4,169,922.

[51] Int. Cl.$^3$ .................. C08G 18/02; C08J 3/18
[52] U.S. Cl. .................. 521/130; 521/107; 521/155; 521/160; 521/175
[58] Field of Search .............. 521/130, 155, 107, 160, 521/175

[56] References Cited

U.S. PATENT DOCUMENTS

| | | | |
|---|---|---|---|
| 2,741,800 | 4/1956 | Brockway | 528/83 |
| 2,811,493 | 10/1957 | Simon et al. | 260/22 TN |
| 2,936,293 | 5/1960 | Orth | 521/130 |
| 3,102,825 | 9/1963 | Rogers et al. | 521/172 |
| 3,143,517 | 8/1964 | Heiss | 521/130 |
| 3,284,275 | 11/1966 | Nelson | 521/55 |
| 3,577,358 | 5/1971 | Santelli et al. | 521/130 |
| 3,772,222 | 11/1973 | Steward et al. | 521/107 |
| 3,975,316 | 8/1976 | Villa | 521/130 |
| 3,994,835 | 11/1976 | Wolf et al. | 521/107 |
| 4,071,482 | 1/1978 | Hopkins et al. | 521/130 |
| 4,169,922 | 10/1979 | Brown et al. | 521/155 |

FOREIGN PATENT DOCUMENTS 785256 10/1957 United Kingdom .

OTHER PUBLICATIONS

Raymond, "New Developments in Urethanes," 4th SPI International Cellular Plastics Conference, Montreal, Canada, Nov. 15–19, 1976, pp. 13–16.

*Primary Examiner*—Ronald W. Griffin
*Attorney, Agent, or Firm*—George R. Beck

[57] ABSTRACT

Advantageous rigid polyurethane foam properties (e.g. compressive strength) can be improved and the proportions of polymerization catalyst and/or surfactant needed to provide a given level of such properties can be lowered by preparing such foams from compositions comprising, in addition to the conventional foam-forming reactants including polyisocyanate and polyol, from about 3% to about 10%, based on the weight of the polyol, of a plasticizer selected from essentially halogen-free phosphates and carboxylates containing at least one aryl radical, e.g. isodecyl diphenyl phosphate or butyl benzyl phthalate.

10 Claims, No Drawings

RIGID POLYURETHANE FOAM-FORMING COMPOSITIONS

Reference to Related Application

This is a continuation-in-part of copending application Ser. No. 864,890 filed Dec. 27, 1977, now U.S. Pat. No. 4,169,922, issued Oct. 2, 1979.

Production of various kinds of rigid polyurethane foam is known in the art. Such production is typically carried out by subjecting a mixture of organic polyisocyanate and polyol having more than two hydroxy radicals per molecule to polyurethane foam-forming reaction conditions. Usually the reaction is catalyzed, e.g. by including an amine or tin compound in the reaction mixture. Also typically included in the mixture are secondary blowing agents (e.g. Freon) to lower the density and surfactants (e.g. silicones) to improve the uniformity of the resulting foam. Such catalysts, surfactants and blowing agents are normally added in relatively small proportions, but they are expensive. Hence the quantities in which they must be used have a significant impact on manufacturing cost of the foam.

Accordingly, it would be very advantageous if significant properties of the foam could be improved without need for more of such expensive constituents of the polymerization mixture, or if foams of equivalent properties could be produced while using smaller quantities of such constituents. An object of this invention is a rigid polyurethane foam-formfing composition which provides those advantages. Another object is to provide the rigid polyurethane foams produced therewith. Other objects of this invention will be apparent from the following in which, except where otherwise noted, percentages are by weight and temperatures are Celsius.

SUMMARY OF THE INVENTION

In accordance with this invention, the aforesaid advantages are provided by use of a rigid polyurethane foam-forming composition comprising an organic isocyanate, a polyol having more than two hydroxy radicals per molecule and, based on the weight of said polyol, from about 3% to about 10% of a plasticizer selected from essentially halogen-free phosphates and carboxylates containing at least one aryl radical. Also provided by this invention are the rigid polyurethane foams produced by subjecting such compositions to polyurethane foam-forming reaction conditions.

DESCRIPTION OF PREFERRED EMBODIMENTS

As used herein, polyurethane foam-forming reactants means polyurethane monomers capable of polymerizing by urethane linkage-forming reactions. Preferably such reactants have not yet undergone substantial polymerization to the extent of forming polyurethane "prepolymer", e.g. as disclosed in U.S. Pat. No. 3,975,316 issued Aug. 17, 1976 to J. L. Villa. Also preferably, the foam-forming compositions of this invention contain essentially no reactants (other than said polyurethane foam-forming reactants) which polymerize substantially under conventional polyurethane foam-forming polymerization conditions.

As aforesaid, this invention is carried out using conventional rigid polyurethane foam-forming reactants including an organic polyisocyanate and a polyol having more than two hydroxy radicals per molecule. Preferred examples of such reactants are polymethylene polyphenyl isocyanates such as 4,4'-diphenylmethane diisocyanate and a castor oil- or sucrose-based hydroxyl-terminated polyhydric polymeric material, respectively. Catalysts which may be used to control the rate of the polymerization of such reactants include various tertiary amines such as, e.g. trialkylamines (hydroxylated or non-hydroxylated) and morpholines, and various tin compounds such as, e.g. stannous oxalate or dibutyl tin oxide. To improve the uniformity of the foam, it has been conventional to include in the reaction mixture a surfactant, normally of the silicone variety, e.g. poly(dialkyl siloxane)s or a silicone-glycol. Blowing agents (e.g. Freon) are typically employed to lower foam density. Also employed in production of the foams of this invention are conventional polyurethane foam-forming reaction conditions which normally include uniform mixing of the urethane-forming reactants and then allowing their exothermic reaction to begin at approximately room temperature and proceed to a desired degree of completion. Commonly the proportion of isocyanate to polyol is varied to achieve a desired relationship between product foam stability and manufacturing cost. Generally such foam stability is better when the NCO/OH Index (theoretical stoichiometric ratio of the isocyanate to the polyol and water present in the reaction mixture and capable of reacting with that isocyanate) is at least about 100 and, usually even more desirably, at least about 103. Further details and numerous additional examples of conventional rigid polyurethane foam-forming reactants, catalysts, surfactants, blowing agents and reaction conditions can be found in the published literature including, e.g. "Polyurethanes—Chemistry and Technology", J. H. Saunders and K. C. Frisch, Interscience Publishers, Division of John Wiley & Sons, Parts I and II (1962 and 1964); "Plastic Foams" edited by K. C. Frisch and J. H. Saunders, Marcel Dekker, Inc., Parts I & II (1972 and 1973); The Development and Use of Polyurethane Products, E. N. Doyle, MacGraw-Hill Book Co. (1971); A Glossary of Urethane Industry Terms, S. Alan Stewart, The Martin Sweets Co., Inc., Louisville, Kentucky (1971); and "The Chemistry of Silicone Surfactants for Urethane Foams", R. M. Byrant et al., Journal of Cellular Plastics 99 (March/April 1973).

The plasticizer used in this invention provides a plasticizing effect on the mixture of reactants employed in preparation of the foams of this invention. It is essentially halogen-free and selected from the group consisting of phosphates and carboxylates containing at least one aryl radical per molecule. Mixtures of such phosphates and/or carboxylates may also be employed.

The phosphate plasticizers which can be used include triaryl phosphates such as, e.g. isopropylphenyl diphenyl phosphate, t-butyl-phenyl diphenyl phosphate, tricresyl phosphate or triphenyl phosphate; alkyl diaryl phosphates such as, e.g. $C_9$–$C_{11}$ alkyl diphenyl phosphate, isodecyl diphenyl phosphate, 2-ethyl-hexyl diphenyl phosphate, isooctyl diphenyl phosphate, $C_7$–$C_9$ alkyl diphenyl phosphate or isononyl dicresyl phosphate; and dialkyl aryl phosphates such as, e.g. diisodecyl phenyl phosphate, di-isododecyl t-butyl-phenyl phosphate or di-undecyl cresyl phosphate. In such phosphates, alkyl radicals directly attached to the phosphate radical each contain preferably from about four to about twenty, and generally even more desirably from about eight to about twelve carbon atoms. Aryl groups directly attached to the phosphate radical may be unsubstituted or substituted, e.g. with one or more alkyl substituents each normally containing from one to about eight, and usually most desirably about three or four carbon atoms. Preferred among those phosphates are alkyl diaryl phosphates, particularly isodecyl diphenyl phosphate, and triaryl phosphates, particularly t-butylphenyl or isopropylphenyl diphenyl phosphate.

The carboxylate plasticizers useful in this invention may contain an aryl radical on either or both sides of a carboxyl radical, e.g. dialkyl phthalates, diaryl adipates or benzyl phthalates. Especially useful are dicarboxylates such as, e.g. phthalates, terephthalates, isophthalates, adipates, succinates, glutarates, sebacates, pimelates, azelates, etc., although mono-carboxylates such as benzyl stearate, etc. are also useful. Preferred are alkyl aryl dicarboxylates, and particularly alkyl benzyl dicarboxylates, in which the alkyl radical contains up to about twenty, and preferably from about four to about twelve carbon atoms, e.g. the branched and normal nonyl, decyl and undecyl benzyl adipates, glutarates and succinates. Most preferred are the phthalates, including dialkyl phthalates in which the average carbon atom content per alkyl radical is from about six to about twelve, e.g. diheptyl, dinonyl, dioctyl or didecyl phthalate, and most advantageously in most instances, alkyl aryl phthalates in which the alkyl radical contains preferably from about four to about twelve carbon atoms, e.g. butyl benzyl phthalate, 7-(2,6,6,8-tetramethyl-4-oxa-3-oxo-nonyl) benzyl phthalate and $C_5$–$C_{12}$ alkyl benzyl phthalates, i.e., the branched and normal pentyl, hexyl, heptyl, octyl, nonyl, decyl, undecyl and dodecyl benzyl phthalates. However, also attractively useful herein are the non-phthalate carboxylates, including isophthalates and terephthalates such as, e.g. bis(2-ethylhexyl)terephthalate, the aforementioned adipates, glutarates and succinates, etc.

As aforesaid, advantageous foam properties and/or lowered requirements for reaction mixture constituents such as polymerization catalysts, surfactants and/or blowing agents are provided when the compositions of this invention contain from about 3% to about 10% of such a plasticizer, based on the weight of polyol in that composition. In most instances, even more advantageous results are obtained when the composition contains not less than about 4% and not more than about 8.5% of the plasticizer, based on the weight of that polyol, and in many instances most advantageous results are obtained when the composition contains not less than about 5 and not more than about 7% of the plasticizer, based on the weight of that polyol. Preferably the plasticizer is essentially uniformly dispersed (e.g. by any conventional means) throughout the foam-forming composition employed in this invention.

The following are specific examples of foam-forming compositions and rigid polyurethane foams produced therefrom in accordance with this invention. These examples are illustrative only and do not imply any limitations on the scope of the invention.

EXAMPLE I

Various rigid polyurethane foam-forming compositions were prepared by mixing 100 parts of a moderate-viscosity, sucrose-based polyol having a hydroxyl number of 470 mg KOH/gm with a polymethylene polyphenyl isocyanate having an NCO content of 31.5% and an amine equivalent of 132, 3 parts of a polymerization catalyst blend composed of 80% dimethylethanolamine and 20% of triethylenediamine, 1.6 parts of a low-viscosity silicone-glycol copolymer surfactant having a viscosity of 465 cs at 25°, 35 parts of Freon and zero or one part of distilled water. Separate batches were made using different proportions of the isocyanate such that they had NCO/OH Indices (defined hereinbefore) of 96, 108 and 120. In two duplicate sets of such compositions, 5 parts and 10 parts, respectively, of butyl benzyl phthalate were also included. The foam-forming compositions were then thoroughly mixed and subjected to conventional polyurethane-forming reaction conditions beginning at room temperature. Each resulting rigid foam was subjected to measurements of density and compression load deflection (hereinafter CLD) by ASTM D-1564-64. Average results were as follows:

TABLE A

| Parts of Butyl Benzyl Phthalate | Index 96 | | | | Index 108 | | | | Index 120 | | | |
|---|---|---|---|---|---|---|---|---|---|---|---|---|
| | CLD[1] | | Density[2] | | CLD[1] | | Density[2] | | CLD[1] | | Density[2] | |
| | No $H_2O$ | $H_2O$ | No $H_2O$ | $H_2O$ | No $H_2O$ | $H_2O$ | No $H_2O$ | $H_2O$ | No $H_2O$ | $H_2O$ | No $H_2O$ | $H_2O$ |
| None | 0.77 | 1.15 | 0.027 | 0.024 | 0.92 | 1.22 | 0.029 | 0.024 | 0.90 | 1.27 | 0.029 | 0.026 |
| 5 | 1.60 | 1.13 | 0.035 | 0.024 | 2.20 | 1.24 | 0.037 | 0.025 | 2.33 | 1.29 | 0.039 | 0.026 |
| 10 | 0.96 | 1.12 | 0.037 | 0.026 | 2.35 | 1.21 | 0.039 | 0.026 | 2.48 | 1.29 | 0.041 | 0.027 |

[1] kg/cm$^2$
[2] g/cc

From Table A it can be seen that particularly at NCO/OH Indices of 108 and 120, the foams made using compositions containing 5 and 10 parts of butyl benzyl phthalate have substantially higher CLD than the corresponding foams made without inclusion of that plasticizer.

EXAMPLE II

Additional runs were carried out varying the concentrations of amine and butyl benzyl phthalate in foam-forming compositions otherwise like those of Example I having an NCO/OH Index of 108 and containing one part of distilled water. Results were as follows:

TABLE B

| Parts of Butyl Benzyl Phthalate | CLD, Kg/cm$^2$ | | | | | Density, g/cc | | | | |
|---|---|---|---|---|---|---|---|---|---|---|
| | 0 | 3 | 5 | 7 | 10 | 0 | 3 | 5 | 7 | 10 |
| 3 parts of the amine | 1.22 | 1.13 | 1.25 | 1.43 | 1.42 | 0.026 | 0.026 | 0.027 | 0.027 | 0.027 |
| 2 parts of |  |  |  |  |  |  |  |  |  |  |

TABLE B-continued

| Parts of Butyl Benzyl Phthalate | CLD, Kg/cm² | | | | Density, g/cc | | | | |
|---|---|---|---|---|---|---|---|---|---|
| | 0 | 3 | 5 | 7 | 10 | 0 | 3 | 5 | 7 | 10 |
| the amine | 1.27 | 0.85 | 1.30 | 1.28 | 1.20 | 0.027 | 0.026 | 0.027 | 0.027 | 0.027 |

From Table B it can be seen that (1) decreasing the parts of amine increases the density of foams were without the butyl benzyl phthalate but shows essentially no effect on the foams made using 3—10 parts of butyl benzyl phthalate and (2) with increasing parts of butyl benzyl phthalate, the CLD increases from 3 parts to a maximum using less than 10 parts thereof.

EXAMPLE III

Additional runs were carried out including butyl benzyl phthalate (10 parts) in foam-forming compositions like those of Example I containing one part water and having an NCO/OH Index of 108 but with varying concentrations of the amine. Results were as follows:

TABLE C

| Butyl Benzyl Phthalate | 3.0 parts Amine | | 4.5 parts Amine | |
|---|---|---|---|---|
| | CLD, kg/cm² | Density, g/cc | CLD, kg/cm² | Density, g/cc |
| None | 1.22 | 0.025 | 1.20 | 0.025 |
| 10 | 1.30 | 0.026 | 1.23 | 0.027 |

Table C shows that in the presence of the butyl benzyl phthalate, increased CLD can be obtained despite the use of less amine.

EXAMPLE IV

Additional runs were carried out including butyl benzyl phthalate (10 parts) in foam-forming compositions like those of Example I having an NCO/OH Index of 108 and containing one part water but with varying concentrations of the silicone. Results were as follows:

TABLE D

| Parts of Butyl Benzyl Phthalate | 0 | 10 | 10 | 10 | 10 | 10 |
|---|---|---|---|---|---|---|
| Parts of Silicone | 1.6 | 1.6 | 1.0 | 0.5 | 0.2 | 0 |
| CLD, kg/cm² | 1.22 | 1.30 | 1.40 | 1.53 | 1.46 | Collapsed |
| Density, g/cc | 0.025 | 0.026 | 0.027 | 0.028 | 0.027 | Collapsed |

Table D shows that in the presence of the butyl benzyl phthalate, increased CLD can be obtained despite the use of less silicone.

I claim:

1. Rigid polyurethane foam produced by subjecting to polyurethane foam-forming reaction conditions a composition comprising rigid polyurethane foam-forming reactants including an organic polyisocyanate and a polyol having more than two hydroxy radicals per molecule and, based on the weight of said polyol, from about 3% to about 10% essentially halogen-free plasticizer selected from $C_5$-$C_{20}$ alkyl aryl phthalates, non-phthalate carboxylates containing at least one aryl radical per molecule, and mixtures thereof.

2. A foam of claim 1 wherein the plasticizer is $C_5$-$C_{12}$ alkyl benzyl phthalate.

3. A foam of claim 1, said composition comprising a silicone surfactant or amine catalyst for the formation of said polyurethane.

4. A foam of claim 3 wherein the plasticizer is $C_5$-$C_{12}$ alkyl benzyl phthalate.

5. A foam of claim 1, said composition containing not less than about 4% and not more than about 8.5% of said plasticizer, based on the weight of said polyol.

6. A foam of claim 5 wherein the plasticizer is $C_5$-$C_{12}$ alkyl benzyl phthalate.

7. A foam of claim 6, said composition comprising a silicone surfactant or amine catalyst for the formation of said polyurethane.

8. A foam of claim 1, said composition containing not less than about 5% and not more than about 7% of said plasticizer, based on the weight of said polyol.

9. A foam of claim 8, said composition comprising a silicone surfactant or amine catalyst for the formation of said polyurethane.

10. A foam of claim 9 wherein the plasticizer is $C_5$-$C_{12}$ alkyl benzyl phthalate.

* * * * *